W. A. HULL.

Inkstand.

No. 8,439. Reissued Oct. 1, 1878.

Witnesses:

P. Dieterich.

Frank H. Duffy

Inventor:

Wolcott A. Hull.

Per C. H. Watson & Co. Attorneys.

N. PETERS, PHOTO-LITHOGRAPHER, WASHINGTON, D. C.

UNITED STATES PATENT OFFICE.

WOLCOTT A. HULL, OF MERIDEN, CONNECTICUT.

IMPROVEMENT IN INKSTANDS.

Specification forming part of Letters Patent No. 201,249, dated March 12, 1878; Reissue No. 8,439, dated October 1, 1878; application filed August 1, 1878.

*To all whom it may concern:*

Be it known that I, WOLCOTT A. HULL, of Meriden, in the county of New Haven and State of Connecticut, have invented certain new and useful Improvements in Inkstands; and I do hereby declare that the following is a full, clear, and exact description thereof, that will enable others skilled in the art to which it appertains to make and use the same, reference being had to the accompanying drawings, and to the letters of reference marked thereon, which form a part of this specification.

The nature of this invention consists in the construction and arrangement of an inkstand the reservoir of which turns upon a pivot, as will be hereinafter more fully set forth.

Figure 1:
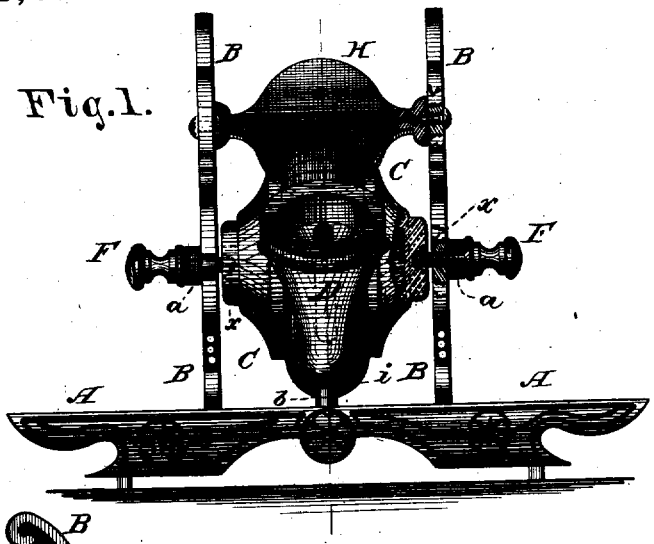
Figure 2:
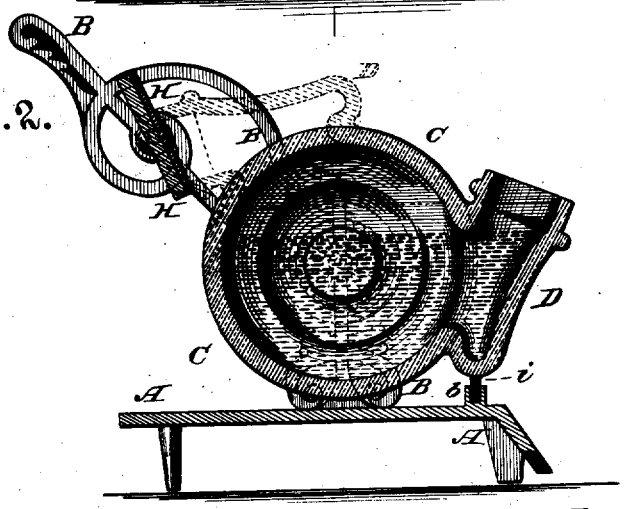
Figure 3:
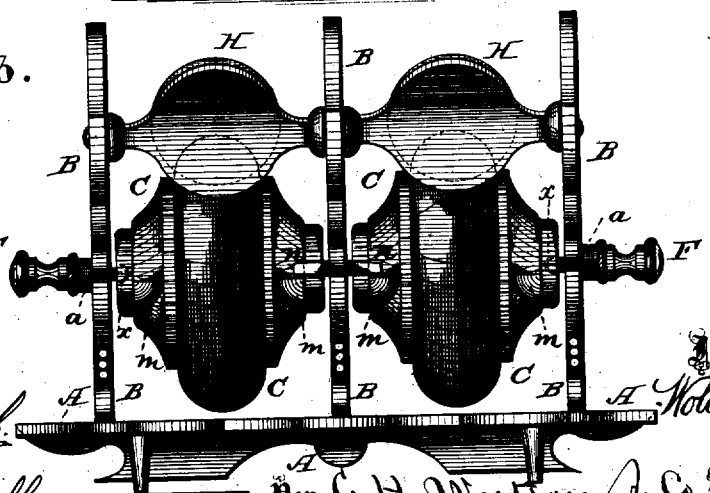

In the annexed drawings, to which reference is made, and which fully illustrate this invention, Figure 1 is a front elevation of the improved inkstand. Fig. 2 is a longitudinal section of the same. Fig. 3 is a rear view, showing a double inkstand.

A represents the base of the inkstand, provided with two frames, B B, inclining backward. These frames may be of any suitable form and design, and are preferably made so as to form a convenient pen-rack. Between the frames B B is the reservoir C, made in the round form, substantially as shown, and provided with a projecting mouth, D. The reservoir C is hung upon the ends of two screws, F F, which are screwed from the outside through the frames B B, and their inner ends entering recesses *x*, formed in the centers of the sides of the reservoir. Upon each screw F, between the head thereof and the outside of the frame, is placed a rubber washer, *a*. On each side of the reservoir is formed a projection, *m*, which comes in contact with a lug, *n*, on the frame B, for holding the reservoir in proper position for use. If, however, too much ink should have been poured into the reservoir C, the latter may be turned on its trunnions or pivots to raise the mouth-piece, and the reservoir be then held steady in such position by tightening the set-screws F F, the points of which bind on the sides of the reservoir and hold the same steady. When the inkstand is not in use the reservoir is turned on its pivots until the mouth-piece D points backward on top, as shown by dotted lines in Fig. 2, and the mouth rests on a rubber-covered plate or disk, H, so as to close the reservoir and prevent the ingress of air. This plate or disk H is pivoted between the frames B B, as shown, so as to accommodate itself to and tightly close the mouth of the reservoir.

It is evident that more than one reservoir may be arranged in like manner on the same base, if desired.

Another form of stop is represented by the post *b* affixed to the base A, having affixed therein a rubber pad, *i*.

It will thus be seen that in either case I have one or more stops elevated above the base, so that the reservoir will at no time come in contact with the base. This is an important feature, as it keeps the base clean, and the reservoir cannot become broken by coming in contact with the base.

I am aware that reservoirs for inkstands have heretofore been used, said reservoirs revolving upon central pivots, one upon either side of the reservoir, and the reservoir held in place by adjusting-screws. I do not therefore claim such as my invention; but,

Having thus fully described this invention, what is claimed as new, and desired to be secured by Letters Patent, is—

1. In an inkstand, the frame B, having lugs *n* formed thereon, said frame supporting the pivoted ink-reservoir, in combination with the ink-reservoir, having the projections *m*, whereby the reservoir is held in place by the projections and lugs and supported by the frame above the base, substantially as and for the purpose set forth.

2. In combination with an ink-reservoir hung upon pivots, a self-adjusting cover for closing the mouth when the reservoir is turned to bring the mouth against the same, as herein set forth.

In testimony that I claim the foregoing I have hereunto set my hand this 19th day of July, 1878.

WOLCOTT A. HULL.

Witnesses:

C. H. WATSON,

EDWIN H. BROWN.